United States Patent
Murray et al.

(10) Patent No.: US 9,526,211 B2
(45) Date of Patent: Dec. 27, 2016

(54) SYSTEM AND METHOD OF CONTROLLING AIRFLOW CHARACTERISTICS IN AN AGRICULTURAL HARVESTER

(71) Applicant: CNH Industrial America LLC, New Holland, PA (US)

(72) Inventors: Craig E. Murray, Davenport, IA (US); Tyler L. Nelson, Rochester, MN (US); Eric E. Veikle, Lititz, PA (US); Kevin S. Schwinn, Orion, IL (US)

(73) Assignee: CNH Industrial America LLC, New Holland, PA (US)

( * ) Notice: Subject to any disclaimer, the term of this patent is extended or adjusted under 35 U.S.C. 154(b) by 156 days.

(21) Appl. No.: 14/193,490

(22) Filed: Feb. 28, 2014

(65) Prior Publication Data

US 2015/0245562 A1    Sep. 3, 2015

(51) Int. Cl.
*G06F 7/70* (2006.01)
*G06F 19/00* (2011.01)
(Continued)

(52) U.S. Cl.
CPC ......... *A01F 12/444* (2013.01); *A01D 41/1276* (2013.01)

(58) Field of Classification Search
CPC ............ G01N 15/1031; G01N 15/1459; G01N 15/1463; G01N 15/147; G01N 15/1475; A01F 12/448; A01F 12/444; A01F 12/28; A01F 12/44; A01F 12/446; A01D 41/1276; A01D 41/127; A01D 41/1273; A01D 75/282
(Continued)

(56) References Cited

U.S. PATENT DOCUMENTS

| | | | |
|---|---|---|---|
| 4,259,829 A | | 4/1981 | Strubbe |
| 4,311,995 A | * | 1/1982 | Kinzie ............... A01D 41/1276 340/607 |

(Continued)

FOREIGN PATENT DOCUMENTS

| | | |
|---|---|---|
| EP | 0 693 252 A1 | 1/1996 |
| GB | 2015854 A | 9/1979 |
| JP | 2002-000052 A | 1/2002 |

OTHER PUBLICATIONS

"Cleaning Shoe Air Velocities in Combine Harvesting of Wheat", Streicher, Stroshine, Krutz and Hinkle, American Society of Agricultural Engineers, vol. 29(4):Jul.-Aug., 1986, pp. 923-928. (6 pages).

*Primary Examiner* — Árpád Fábián-Kovács
(74) *Attorney, Agent, or Firm* — Patrick M. Sheldrake

(57) ABSTRACT

An agricultural harvesting system including a chassis, an agricultural product moving device coupled to the chassis, an airflow system, a cleaning system and an airflow characterizing system. The cleaning system is configured to receive the agricultural product from the moving device. The cleaning system is configured to receive an airflow from the airflow system. The airflow characterizing system is at least partially positioned in the airflow, and is configured to measure an airflow profile across the cleaning system. The airflow characterizing system includes a plurality of sensors that determine airflow by measuring a thermal transfer from the sensors to the airflow. The airflow characterizing system being configured to maintain a substantially constant electrical resistance of the sensors as the airflow varies. The airflow characteristics are measured in the cleaning system and are used to improve the cleaning capacity of the harvesting system.

20 Claims, 6 Drawing Sheets

(51) Int. Cl.
*G06G 7/00* (2006.01)
*G06G 7/76* (2006.01)
*A01F 12/44* (2006.01)
*A01D 41/127* (2006.01)

(58) Field of Classification Search
USPC .... 701/50; 56/10.2 R; 460/99, 5, 109, 7, 72, 460/1; 340/684
See application file for complete search history.

(56) References Cited

U.S. PATENT DOCUMENTS

| | | | | |
|---|---|---|---|---|
| 4,466,231 A * | 8/1984 | Rowland-Hill | ....... | A01F 12/448 460/2 |
| 4,527,241 A * | 7/1985 | Sheehan | ............. | A01D 41/127 56/10.2 R |
| 4,589,425 A | 5/1986 | Mitchell, Jr. | | |
| 5,775,072 A * | 7/1998 | Herlitzius | .......... | A01D 41/1276 460/4 |
| 6,632,136 B2 * | 10/2003 | Anderson | ............. | A01F 12/448 460/101 |
| 6,869,355 B2 * | 3/2005 | Bernhardt | .......... | A01D 41/1273 460/1 |
| 6,921,330 B2 * | 7/2005 | Grywacheski | ........ | A01F 12/446 416/187 |
| 7,249,449 B2 | 7/2007 | Goering et al. | | |
| 7,354,341 B1 | 4/2008 | Smith et al. | | |
| 7,544,125 B2 | 6/2009 | Smith | | |
| 7,584,663 B2 * | 9/2009 | Missotten | .......... | A01D 41/1273 209/599 |
| 7,630,808 B2 * | 12/2009 | Behnke | ................ | A01D 41/127 56/10.2 F |
| 7,645,190 B2 * | 1/2010 | Schwinn | ........... | A01D 41/1276 460/6 |
| 7,670,218 B2 * | 3/2010 | Behnke | .............. | A01D 41/1276 460/4 |
| 7,846,013 B1 * | 12/2010 | Diekhans | .......... | A01D 41/1276 460/1 |
| 7,976,369 B2 | 7/2011 | Craessaerts et al. | | |
| 8,118,649 B1 * | 2/2012 | Murray | ................ | A01D 75/282 460/4 |
| 8,676,453 B2 * | 3/2014 | Behnke | .............. | A01D 41/1276 460/101 |
| 2009/0036184 A1 * | 2/2009 | Craessaerts | ........... | A01F 12/448 460/1 |
| 2012/0184339 A1 | 7/2012 | Schulz | | |
| 2014/0088840 A1 * | 3/2014 | Baumgarten | ......... | B60K 28/06 701/50 |

* cited by examiner

SYSTEM AND METHOD OF CONTROLLING AIRFLOW CHARACTERISTICS IN AN AGRICULTURAL HARVESTER

BACKGROUND OF THE INVENTION

1. Field of the Invention

The present invention relates to agricultural harvesters such as combines, and, more particularly, to cleaning systems used in such combines.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material, such as straw, from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

In the paper entitled, "Cleaning Shoe Air Velocities in Combine Harvesting of Wheat", published in the *American Society of Agricultural Engineers* (Volume 29(4): July-August 1986), it is discussed that thermistors were used as sensors heating them well above ambient temperature. And that the resistance change caused by the cooling effect of the air was sensed by measuring the voltage drop across each thermistor. This can be problematic with the sensors being the hottest when the airflow is the lowest, such as when crop material may be lodged against the sensor.

The cleaning system of prior art harvesters have certain adjustments that can be made, which for the most part are static during the harvesting operation, and there is a lack of information about the airflow in the cleaning system so that adequate airflow adjustments can be made.

What is needed in the art is an airflow control system that can monitor and adjust the airflow profile in a dynamic fashion as the combine is harvesting crops.

SUMMARY OF THE INVENTION

The present invention provides a system and method of measuring and controlling an airflow profile in a cleaning system of a combine as harvesting of a crop is underway.

The invention in one form is directed to an agricultural harvesting system including a chassis, an agricultural product moving device coupled to the chassis, an airflow system, a cleaning system and an airflow characterizing system. The airflow system includes a fan, and is coupled to the chassis. The cleaning system is coupled to the chassis, and is configured to receive the agricultural product from the moving device. The cleaning system is configured to receive an airflow from the airflow system. The airflow characterizing system is at least partially positioned in the airflow, and is configured to measure an airflow profile across the cleaning system. The airflow characterizing system includes a plurality of sensors that determine airflow by measuring a thermal transfer from the sensors to the airflow. The airflow characterizing system being configured to maintain a substantially constant electrical resistance of the sensors as the airflow varies.

The invention in another form is directed to an airflow control system used in an agricultural harvesting system. The airflow control system including an airflow generating system and an airflow characterizing system. The airflow generating system includes a fan configured to generate an airflow. The airflow generating system is coupled to the harvester. The airflow characterizing system is at least partially positioned in the airflow. The airflow characterizing system is configured to measure an airflow profile across the cleaning system. The airflow characterizing system includes a plurality of sensors that determine airflow by measuring a thermal transfer from the sensors to the airflow. The airflow characterizing system is configured to maintain a substantially constant electrical resistance of the sensors as the airflow varies.

The invention in yet another form is directed to a method of controlling airflow in a cleaning system of an agricultural harvesting system. The method includes the steps of generating an airflow in the cleaning system, and characterizing the airflow. The airflow in the cleaning system is characterized with an airflow characterizing system by the execution of the steps of measuring and creating. The measuring step measures portions of the airflow with a plurality of sensors, with each of the sensors producing a signal representative of a thermal transfer from the sensor to the airflow. The airflow characterizing system is configured to maintain a substantially constant electrical resistance of the sensors as the airflow varies. The creating step creates an airflow profile across the cleaning system.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
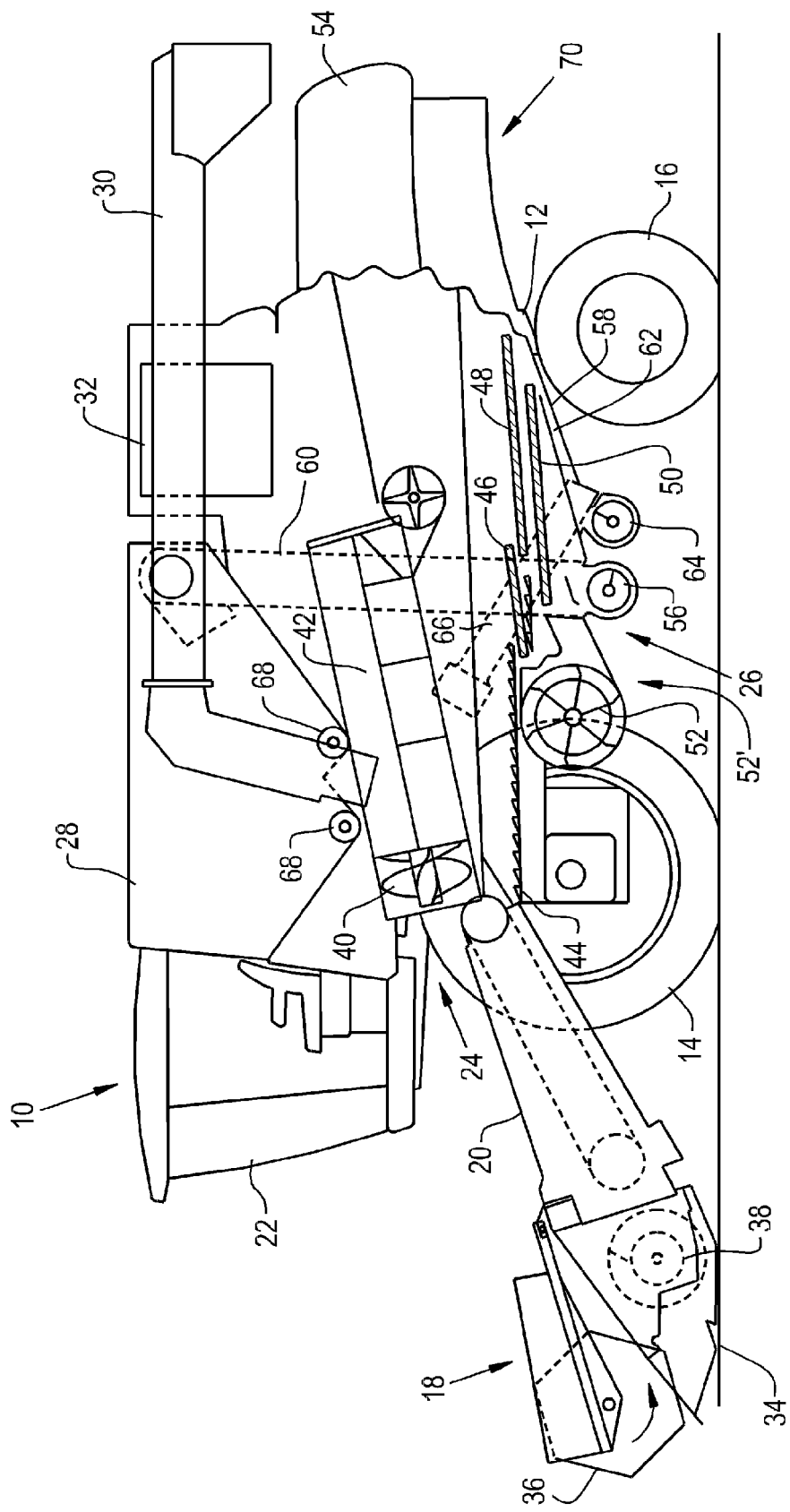
FIG. 1 is a side view of an embodiment of an agricultural harvester in the form of a combine which includes an embodiment of an airflow control system of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Now, additionally referring to FIGS. 2-9 there is shown an airflow characterizing system 72 (illustrated schematically in FIG. 8) having a controller 74, airflow alteration devices 76, a temperature sensor 78 and a sensor grid 80 or 80'. Two embodiments of the present invention are illustrated, one being shown in FIGS. 2-4 and another in FIGS. 5-7.

Controller 74, while shown as a standalone controller, will likely have its functions incorporated into a controller that performs other functions in combine 10. Temperature sensor 78 is used to measure the temperature of an airflow 84 or 84' and that temperature is used by controller 74 to determine the heat dissipation of sensors 82, 82' that make up sensor grid 80, 80', to thereby arrive at an airflow detected by each sensor 82, 82' and the measured airflow profile.

Figure 2:
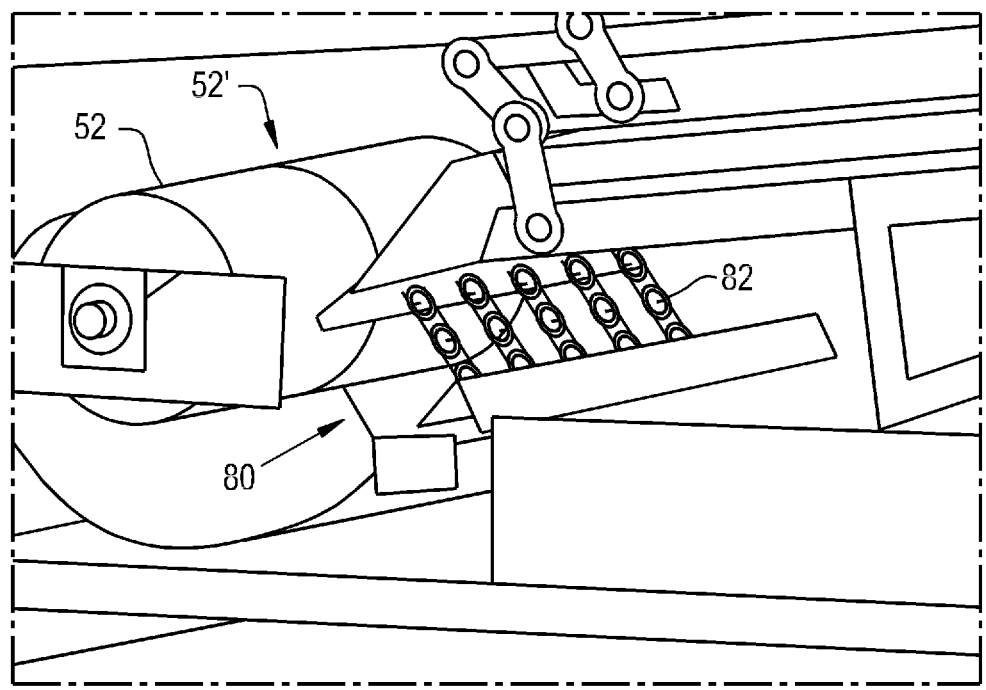
FIG. 2 is a cutaway perspective view of part of the cleaning system contained in the combine of FIG. 1.
Figure 3:
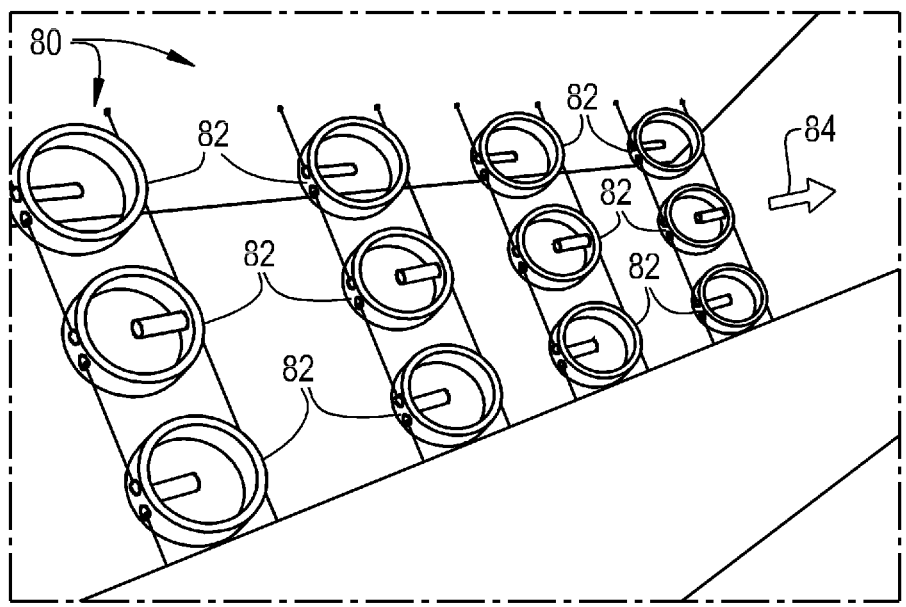
FIG. 3 is a perspective view of a sensor grid of an airflow characterizing system associate with the cleaning system of FIG. 2.
Figure 4:
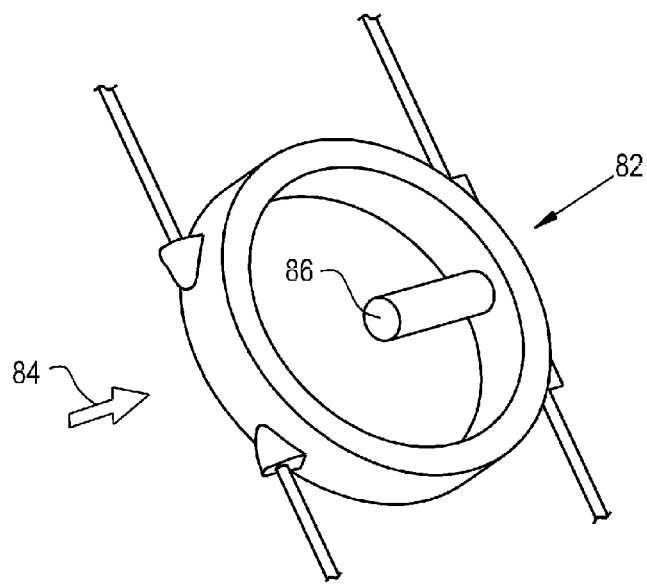
FIG. 4 is closer perspective view of one of the sensors of the grid of sensors of FIGS. 2 and 3.

Sensor grid 80 is illustrated in FIGS. 2 and 3 where sensor grid 80 is positioned in an airflow 84. Airflow 84 originates by the action of fan 52 and it is used in cleaning system 26 to clean the grain. Sensor grid 80 is a grid of sensors 82 that are generally arranged in a plane that is substantially normal to the direction of airflow 84. Although the positioning of sensors 82 is illustrated as being generally ordered in regularly spaced intervals, other positions within the grid are also contemplated. Airflow 84 is detected by sensors 82 and this information is provided to controller 74 so that the measured airflow profile across cleaning system 26 is established, so that the airflow profile can be altered by airflow alteration device 76. Airflow alteration device 76 can also be understood to be an airflow adjusting system 76 that can consist of a variety of passive and active device that can alter characteristics of airflow 84 as it passes through cleaning system 26.

Figure 5:
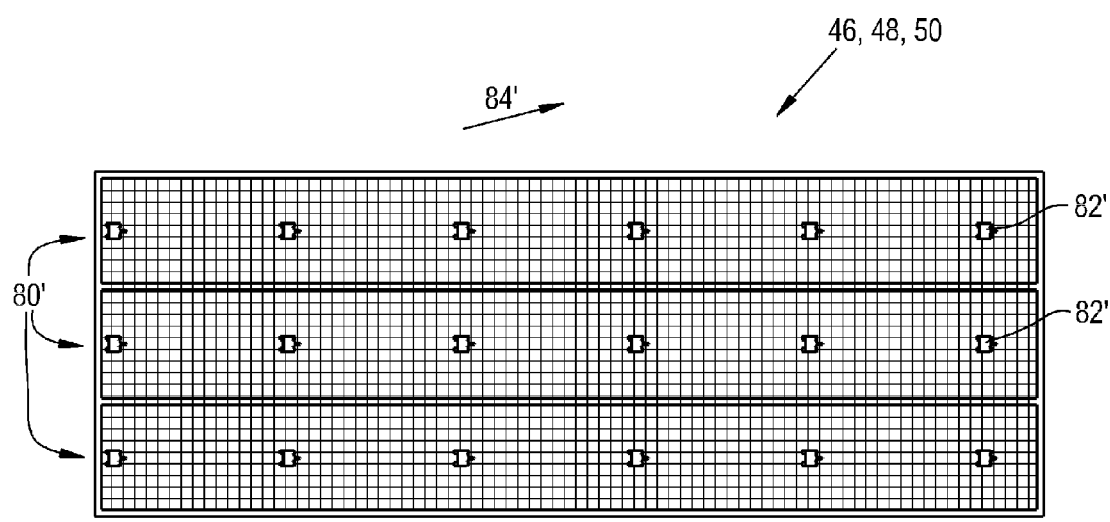
FIG. 5 is a view of a sieve, associated with the cleaning system of FIG. 2, having sensors in the form of another embodiment of a sensor grid of the present invention in the combine of FIG. 1.
Figure 6:
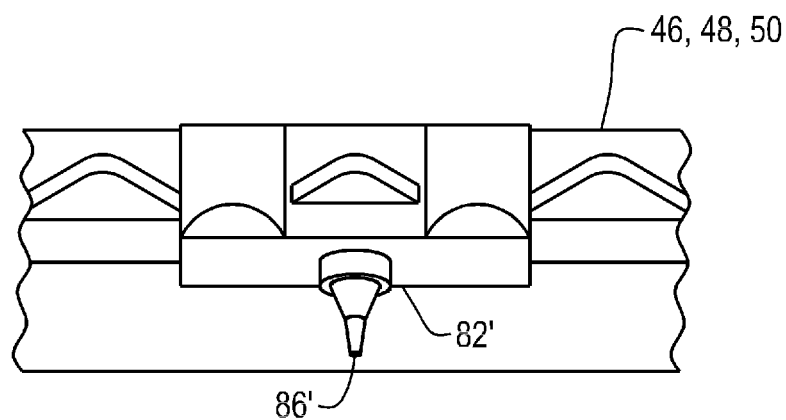
FIG. 6 illustrates a closer front view of one of the sensors in the grid of FIG. 5.
Figure 7:
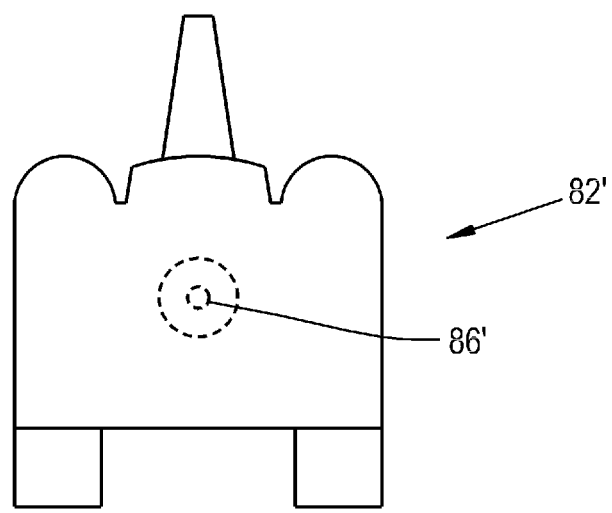
FIG. 7 is a top view of the sensor of FIG. 6.
Figure 8:
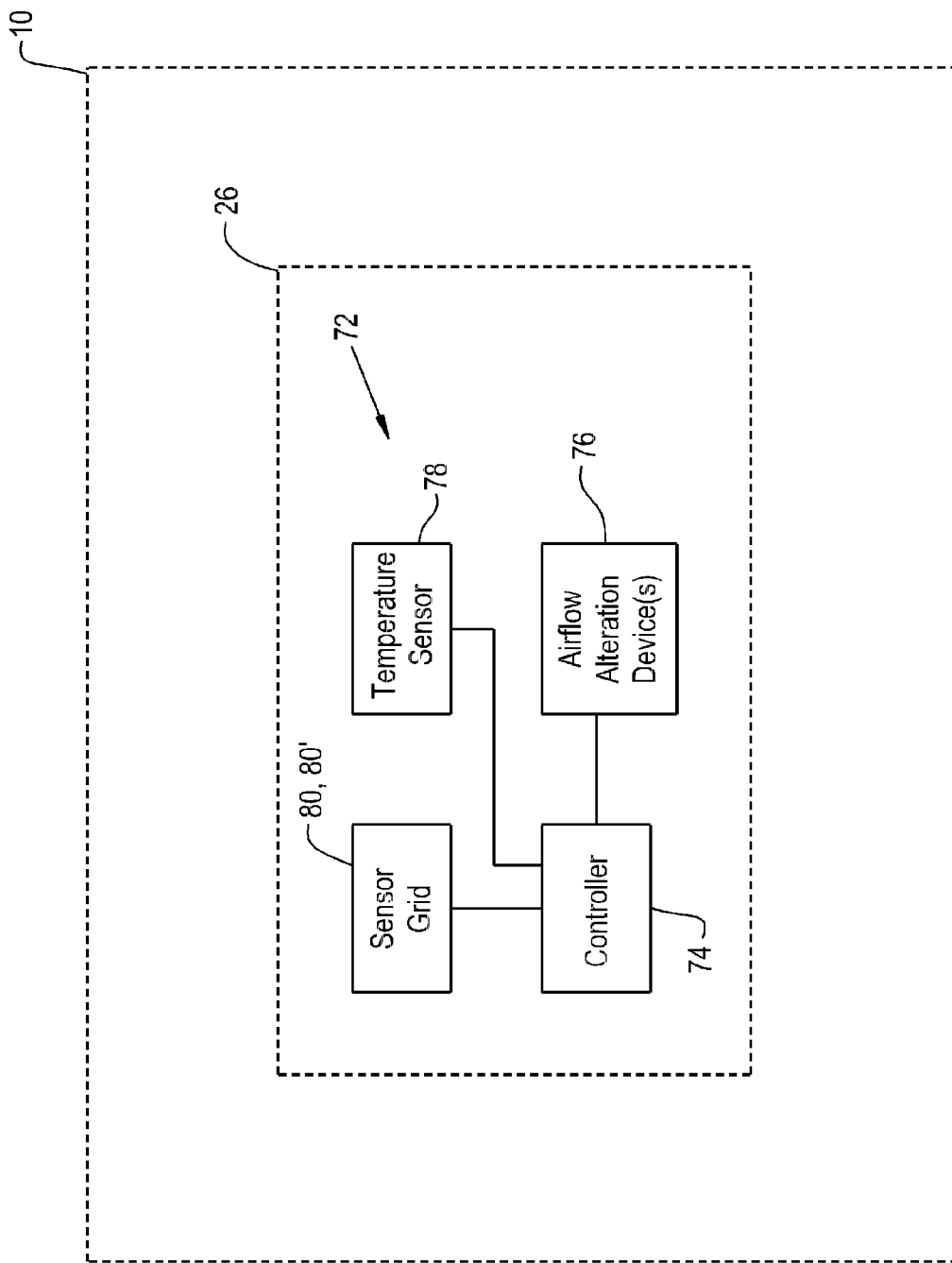
FIG. 8 is a schematical representation of an embodiment of an airflow control system of the present invention using elements of FIGS. 2-7 in the harvester of FIG. 1.
Figure 9:
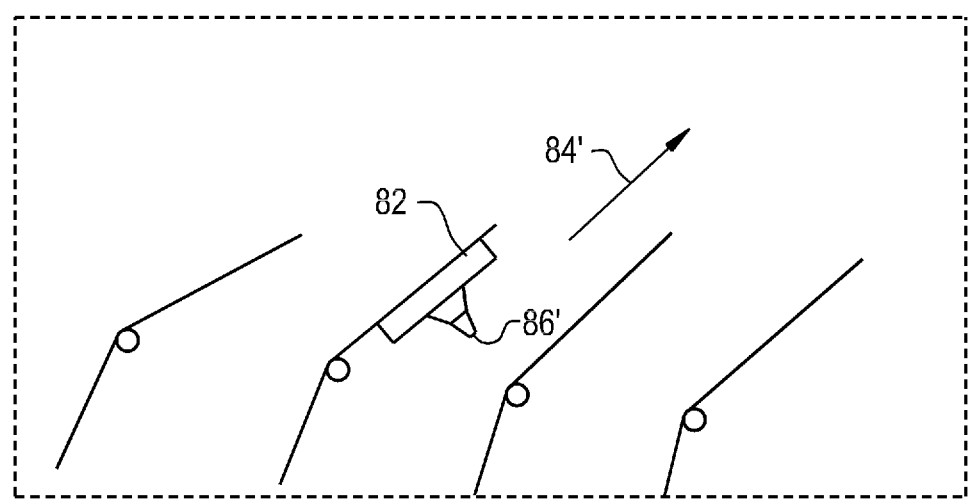
FIG. 9 is a schematical side view of the sieve of FIG. 5 illustrating an airflow past a sensor of FIGS. 5-7.

Sensor grid 80' is illustrated in FIG. 5 where sensor grid 80' is positioned in an airflow 84', which is generally perpendicular to sieve 46, 48, 50. Airflow 84' is schematically shown at an angle in FIG. 5 to show that the airflow as it goes through sieve 46, 48, 50 is angled upwardly. Airflow 84' originates by the action of fan 52 and it is used in cleaning system 26 to clean the grain. Sensor grid 80' is a grid of sensors 82' that are generally arranged in a plane that is substantially normal to the direction of airflow 84'. Sensors 82' are coupled to fins of sieve 46, 48 or 50, as shown in more detail in FIG. 6. A sensor 82' is depicted in FIG. 7, with a thermistor in distal end 86'. The thermistor is positioned, so that the heat conduction in the assembly and to the surrounding air is known, and generally, even substantially, consistent between sensors 82, 82' in respective grids 80, 80'. Although the positioning of sensors 82' is illustrated as being generally ordered in regularly spaced intervals, other positions within the grid are also contemplated. Airflow 84' is detected by sensors 82' and this information is provided to controller 74, in the form of a signal that is related to heat transfer to the surrounding air, so that an airflow profile across cleaning system 26 is established, allowing controller 74 to alter the airflow, and hence the airflow profile, by way of airflow alteration device 76, which can also be understood to be an airflow adjusting system 76 that can consist of a variety of passive and active device that can alter characteristics of airflow 84' as it passes through cleaning system 26.

While the present invention could use both a grid 80 and a grid 80' on one or more of sieves 46, 48 or 50, for the ease of discussion, it will be assumed that just one grid 80 or 80' will be used in a combine 10. The measured airflow profile can be understood to provide a distribution of airflows that controller 74 seeks to optimize, as compared to a selected airflow profile that is selected based on grain and material other than grain (MOG) characteristics.

The operational parameters of the combine harvester cleaning system 26 are dependent on the characteristics of the air flowing in cleaning system 26. The present invention uses multiple sensors 82 or 82' respectively arranged in sensor grids 80, 80' to measure characteristics of air passing through cleaning system 26 and more particularly sieve 46, 48 and 50 for the purpose of defining the operational efficiency of cleaning system 26. Airflow characterizing system 72 provides meaningful data that can be considered to be an airflow profile output under the circumstances associated with collecting data while combine 10 is operational. The meaningful data is used by controller 74 to control various settings within combine 10.

During harvesting operations, and airflow system 52' that includes fan 52 is used to generate a volume of high velocity air which is strategically blown through cleaning system sieves 46, 48, 50 to provide an air blast for pneumatic separation of grain from MOG. The purpose of the air blast is to assist the mechanical separation of grain and MOG. Sieves 46, 48 and 50 are physically very large assemblies positioned within combine 10. During operation, sieves 46, 48, 50 reciprocate back and forth at a frequency of about 4.5 Hz (with some combines operating at frequencies between 3.3 and 5.8 Hz). Due to the motion and location of sieves 46, 48 and 50, as well as taking into account the dirty conditions and volume of crop passing over the sieves, there is no system in the prior art to measure the characteristics of the air flowing through sieves 46, 48, 50. The present invention has the ability to identify the overall airflow characteristics for the entire area of a sieve, thereby allowing the settings of combine 10 to be continually optimized. In the prior art, without knowing the airflow characteristics in the cleaning system, the settings of the combine are not able to be adjusted to optimize the cleaning system performance. The optimum settings for a given crop condition are difficult to determine without knowing the airflow characteristics.

Generally, in the prior art, the settings are held constant even as crop conditions change, causing the cleaning system to never be optimized and even if the settings were good for one crop condition, with changes to the crop condition causing the cleaning system performance to decrease. The settings are held constant because optimizing the settings without knowing the airflow characteristics is not practical.

In the present invention a series of sensors 82, 82', such as in the form of thermistors, are placed in cleaning system 26 to quantify the spatial air velocity in cleaning system 26. The type of sensors might include, but are not limited to, thermistors, and could among other types include: hot wire anemometers, vane anemometers, pitot tube pressure transducers, etc. For purposes of discussion the preferred embodiment will be considered to be thermistors, with the thermistors being located at a distal end 86, 86' of sensors 82, 82'. The locations that sensors 82, 82' could be positioned within combine 10 include, but are not limited to, the inlet or outlet of cleaning fan 52 or other fans, between the sieve louvers, on the chaffer, or shoe sieve, between the chaffer and shoe sieve, below the shoe sieve or above the chaffer sieve.

The signal from sensors 82, 82' (thermistors) is used to quantify the local air velocity, at the sensor's location. The optimum air pattern in cleaning system 26 for a given crop and condition is established, prior to harvesting, either by an empirical, analytical or stochastic model or some combination thereof to identify what the optimum air pattern in cleaning system 26 should be. A significant aspect of the present invention is the ability use sensors 82, 82' so that they can accurately depict the characteristics of the airflow being measured in combine 10 during operation. Airflow characterizing system 72 is used while crop is being processed by cleaning system 26 to identify and to adjust for the optimum air distribution in cleaning system 26. Additionally, airflow characterizing system 72 can be used while the cleaning system is not processing crops to provide design engineers with information regarding the airflow distribution in the system. The airflow distribution is used to identify design changes to cleaning system 26 and to identify the optimum no-crop-load air distribution.

The use of thermistors by the present invention, relative to both crop airflow and non-crop airflow measurements, is the technique used to quantify the air velocity with the thermistors. There are at least two ways in which a thermistor is used to quantify air velocity by the present invention. First, the thermistor is electrically placed in series with a precision resistor and the circuit is subject to a constant excitation, with the variation in current through the resistor and thermistor being monitored, which is representative of heat transfer to the airflow and hence of the velocity of the airflow past the sensor. With a known air temperature, the heat transfer from the thermistor is mathematically related to the airflow past sensor 82, 82'. The second approach uses a feedback control loop to maintain a constant resistance in the thermistor, with the control loop characteristics then providing a signal that is related to the heat transfer of the thermistor and thus the airflow past the thermistor.

Both techniques require the relationship between the heat transfer from the thermistor to the air to be quantified, as this relationship allows the air velocity to be indirectly measured. For purposes of the present invention, the second technique is considered the preferred method. The first technique results in the sensor being hottest when the air velocity past the thermistor is at a minimum. This could occur if there was a buildup of MOG on the thermistor. Having dry MOG against a thermistor, which could reach temperatures in excess of 100° C., could be undesirable, at least resulting in sensor failure. The advantage of the preferred second system, with the constant resistance thermistor, is that the thermistor temperature is held constant, regardless of the air velocity past the thermistor, thereby mitigating overheating risk. This particular system maintains a nearly constant resistive value for the sensor 82, 82', hence keeping the thermistor at a generally constant temperature. Controller 74 alters the current flow through the thermistor (or the voltage across the thermistor) to maintain the thermistor resistance value. The controlled current flow is the signal that relates to the heat transfer to the air from the thermistor, and hence is representative of the airflow past the thermistor.

The airflow velocity in cleaning system 26 is affected by the amount, or load of crop in cleaning system 26. By having sensor grid 80, 80' to provide several airflow measurements, the airflow profile across the cleaning system, several forms of adjustment can be made by control system 72 to improve efficiency of cleaning system 26. To effectively control the airflow profile in cleaning system 26 a number of adjustments can be made by airflow adjusting system 76 to achieve the optimum air pattern, including but not limited to: 1. Divert the air in the system, for example, a series or grid of rotatable louvers, or vanes can be added in front of, or below, sieve 46, 48, 50, in the fan ductwork, and or between the upper and lower sieves. The louvers are used to modify the spatial distribution or pattern of airflow in cleaning system 26 as well as the average air velocity. 2. Change the speed of the cleaning fan. 3. Varying the opening size of the inlet and or outlet of cleaning fan 52. 4. The sieve slat openings could be adjusted (opened more or opened less). 5. Additional fans can be added to cleaning system 52, which are turned off/on/sped up/slowed down. 6. The oscillation frequency of cleaning system 26 can also be adjusted. 7. The sieve motion (stroke length, angle of inclination, angle of oscillation) can be modified. 8. Air exhaust ports can be open/closed. 9. The ground speed of combine 10 can be slowed down or sped up.

The present invention has certain advantages including improved cleaning system performance allowing cleaning system 26 to be able to more effectively separate grain from MOG. Further, the feedback from airflow characterizing system 72 can be used by either the operator to adjust elements of combine 10 and/or it could be used in conjunction with control software to allow combine 10 to make autonomous adjustments of combine 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvesting system, comprising:
   a chassis;
   an agricultural product moving device coupled to said chassis;
   an airflow system including a fan, said airflow system being coupled to said chassis;
   a cleaning system coupled to said chassis, said cleaning system being configured to receive said agricultural product from said moving device, said cleaning system being further configured to receive an airflow from said airflow system; and
   an airflow characterizing system coupled to said chassis, said airflow characterizing system being configured to measure an airflow profile across said cleaning system, said airflow characterizing system including a plurality of sensors positioned at spaced locations in said airflow that determine airflow by measuring a thermal transfer from said sensors to said airflow, said airflow characterizing system being configured to maintain a substantially constant electrical resistance of said sensors as said airflow varies.

2. The agricultural harvesting system of claim 1, further comprising an airflow adjusting system configured to alter at least one characteristic of said airflow dependent upon said airflow profile measured by said airflow characterizing system.

3. The agricultural harvesting system of claim 2, wherein said airflow adjusting system is further configured to at least one of divert air in the airflow, alter a speed of the fan, vary an inlet opening through which air of the airflow flows, vary an outlet though which the air flows, vary slat openings in a sieve, alter a speed of an auxiliary fan, alter a movement characteristic of the sieve, alter an opening of an air exhaust port, alter a ground speed of the harvesting system.

4. The agricultural harvesting system of claim 1, wherein said sensors each include a thermistor.

5. The agricultural harvesting system of claim 4, wherein said plurality of sensors are arranged in a grid.

6. The agricultural harvesting system of claim 5, wherein said grid is generally arranged in a plane that is generally normal to a direction of the airflow.

7. The agricultural harvesting system of claim 6, wherein said grid is proximate to said fan.

8. The agricultural harvesting system of claim 6, wherein said cleaning system includes a sieve, said grid being supported by said sieve.

9. An airflow control system used in an agricultural harvesting system having a cleaning system, the airflow control system comprising:
an airflow generating system including a fan configured to generate an airflow, said airflow generating system being coupled to the harvester; and
an airflow characterizing system, said airflow characterizing system being configured to measure an airflow profile across the cleaning system, said airflow characterizing system including a plurality of sensors positioned at spaced locations in said airflow that determine airflow by measuring a thermal transfer from said sensors to said airflow, said airflow characterizing system being configured to maintain a substantially constant electrical resistance of said sensors as said airflow varies.

10. The airflow control system of claim 9, wherein the airflow control system is configured to alter at least one characteristic of the airflow dependent upon said airflow profile measured by said airflow characterizing system.

11. The airflow control system of claim 10, wherein the airflow control system is further configured to at least one of divert air in the airflow, alter a speed of the fan, vary an inlet opening through which air of the airflow flows, vary an outlet though which the air flows, vary slat openings in a sieve, alter a speed of an auxiliary fan, alter a movement characteristic of the sieve, alter an opening of an air exhaust port, alter a ground speed of the harvesting system.

12. The airflow control system of claim 9, wherein said sensors each include a thermistor.

13. The airflow control system of claim 12, wherein said plurality of sensors are arranged in a grid.

14. The airflow control system of claim 13, wherein said grid is generally arranged in a plane that is generally normal to a direction of the airflow.

15. The airflow control system of claim 14, wherein said grid is proximate to said fan.

16. The airflow control system of claim 15, wherein said cleaning system includes a sieve, said grid being supported by said sieve.

17. A method of controlling airflow in a cleaning system of an agricultural harvesting system, the method comprising the steps of:
generating an airflow in the cleaning system; and
characterizing the airflow in the cleaning system with an airflow characterizing system by executing the steps of:
measuring portions of the airflow with a plurality of sensors positioned at spaced locations in said airflow, each of said sensors producing a signal representative of a thermal transfer from said sensor to said airflow;
maintaining a substantially constant electrical resistance of said sensors regardless of the amount of said airflow thereby holding a temperature of said sensors constant; and
creating an airflow profile across the cleaning system.

18. The method of claim 17, further comprising the step of adjusting the airflow to alter at least one characteristic of the airflow dependent upon said airflow profile created by said airflow characterizing system.

19. The method of claim 18, wherein the adjusting step includes at least one of:
diverting air in the airflow;
altering a speed of a fan;
varying an inlet opening through which air of the airflow flows;
varying an outlet though which the air flows;
varying slat openings in a sieve;
altering a speed of an auxiliary fan;
altering a movement characteristic of the sieve;
altering an opening of an air exhaust port; and
altering a ground speed of the agricultural harvesting system.

20. The method of claim 17, wherein said sensors each include a thermistor.

* * * * *